3,200,060
DECOLORIZING PETROLEUM WAX
Arthur T. Polishuk, Media, Pa., assignor to Sun Oil Company, Philadelphia, Pa., a corporation of New Jersey
No Drawing. Filed June 30, 1960, Ser. No. 39,792
6 Claims. (Cl. 208—24)

It is known in the art to decolorize petroleum wax by mixing the wax with hot butyl alcohol to obtain a dispersion of wax in the alcohol and allowing alcohol-insoluble color bodies, originally in the wax, to settle out. The extent of decolorization is frequently insufficient, however, particularly in the case of a wax that is initially quite dark.

According to the present invention, an improved decolorization is obtained by employing an aromatic hydrocarbon in conjunction with an alkanol. The process of the invention involves mixing petroleum wax at 150 to 300° F. with 200 to 1500 weight percent based on wax of an alkanol having 3 to 6 carbon atoms, and with 5 to 250 weight percent based on wax of an aromatic hydrocarbon having 6 to 9 carbon atoms, allowing the mixture to settle at 150 to 300° F. to form an upper phase comprising a dispersion of wax in alkanol and aromatic hydrocarbon and a lower phase comprising color bodies, and recovering decolorized wax from the upper phase. Preferably the amounts of alkanol and aromatic hydrocarbon are in the range from 300–1000 weight percent, and 10 to 100 weight percent respectively, based on wax.

Preferably the color bodies are withdrawn at 150 to 300° F. from the bottom of the treating vessel, leaving the alcohol phase. The latter is then preferably heated to strip off the alkanol and aromatic hydrocarbon, leaving decolorized molten wax as residue. The latter is then further treated by known procedures, or cooled to form wax slabs, etc.

If the stratified alcohol phase and color bodies are cooled without prior separation, the alcohol phase typically sets up to form solidified wax containing occluded alcohol and aromatic hydrocarbon, and the color bodies can be scraped from the under surface of the solidified wax. The occluded solvents can then be stripped off.

Paraffin and microcrystalline waxes can be decolorized according to the invention. The melting point of the wax is usually, but not necessarily, in the range from 125 to 215° F. The oil content of the wax is usually, though not necessarily, less than 5 weight percent.

The process can be carried out at atmospheric pressure or at elevated pressure, e.g. up to 250 p.s.i.g. Elevated pressure is used if necessary to maintain the solvents in the liquid phase.

The settling time for the passage of color bodies to the bottom of the treating vessel can be any suitable time to obtain the desired extent of removal of color bodies from the alkanol phase. Typically the time is in the range from 1 to 30 minutes, but others are suitable in some cases. Batch or continuous mixing and settling can be employed.

The yield of decolorized wax obtained in the process of the invention is typically at least 95 weight percent based on charge, and often at least 98 weight percent. The color improvement is usually at least one unit on the NPA scale and frequently at least two or three units.

Water can be added to the treating system according to the invention, e.g. in amount in the range previously given for the amount of aromatic hydrocarbon. The addition of water is not necessary, however, for the superior decolorization according to the invention.

The following examples illustrate the invention:

*Example I*

The charge material is a black microcrystalline wax having melting point of about 190° F. Such wax is typically obtained by furfural refining of petroleum lubricating oil, solvent dewaxing of the raffinate to obtain a slack wax, distillation of the slack wax to obtain a residue constituting about 30% of the slack wax, and solvent deoiling of the residue employing a filtration temperature of about 90° F. to produce the specified wax.

About 100 grams of the wax is melted and mixed with about 600 ml. of n-butyl alcohol at about 200° F. to obtain a solution of wax in the alcohol. A small amount of black tarry material is undissolved and settles out upon standing. Upon cooling to about 170° F., a dark brown, opaque solution or suspension of wax in alcohol is obtained, with the tarry material at the bottom.

About 50 ml. of benzene are added while maintaining the temperature at about 170° F. Immediate visible precipitation of color bodies from the alcohol phase takes place, and the color bodies settle into the tarry material already at the bottom of the vessel, while the benzene goes into solution in the alcohol. The bottom layer of tarry material is drawn off, leaving a milky white solution or suspension of wax in the alcohol phase. Alcohol and benzene are stripped off to obtain decolorized wax as residue.

Generally similar results are obtained using n-propanol, isopropanol, sec-butyl alcohol, n-amyl alcohol, tert. amyl alcohol or hexyl alcohols in place of the n-butyl alcohol, and using toluene, o-xylene, p-xylene, mesitylene, etc. in place of the benzene.

Generally similar results are also obtained using other proportions of alkanol and aromatic hydrocarbon within the ranges set forth previously. The use of relatively large proportions of alkanol favors solution of the wax in the alkanol, and the use of relatively large quantities of aromatic hydrocarbon favors the precipitation of color bodies from the alkanol phase.

Operation at other temperatures within the range previously stated gives generally similar results to those at about 170° F. Elevated pressure is used at the higher temperatures in the range, where necessary to maintain liquid phase. Temperatures below 150° F. are not used, since they provide unsatisfactory maintenance of wax in dispersed condition in the alkanol. Preferred temperatures are those in the range from 150 to 225° F.

*Example II*

Operation like that in Example I is performed, about 200 ml. of water being added to the alcohol phase after the addition of the benzene. The water settles to the bottom, and upon agitation of the system, followed by settling again at 170° F., a clear bottom water layer is obtained, with a layer of tarry material floating on the water layer and between the water layer and the alcohol phase. The water is withdrawn from the bottom, and then the tarry material. Alcohol and benzene are stripped from the milky white solution or suspension of wax, and decolorized wax is obtained as residue.

Example III

Operation like that in Example II is carried out, except that the addition of benzene is omitted. Upon addition of water to the alcohol phase containing wax, the water settles to the bottom. The alcohol phase remains dark brown and opaque, and recovery of wax from the alcohol phase results in an inferior, dark brown product.

Comparison of Examples II and III shows the necessity for the hydrocarbon in order to obtain optimum decolorization.

Example IV

Operation like that in Example I is carried out, except that n-heptane is employed in place of benzene. The heptane goes into solution in the alcohol phase, but there is little or no precipitation of color bodies from the alcohol phase, and the latter remains dark brown and opaque. Recovery of wax from the alcohol phase results in an inferior, dark brown product.

Comparison of Examples II and IV shows the necessity for using an aromatic rather than an aliphatic hydrocarbon.

Example V

About 75 grams of another portion of the same wax as in Example I is heated with about 400 ml. of benzene to obtain a solution of the wax in the benzene. A homogeneous dark-colored solution is obtained, and no color bodies settle out. Upon cooling to 170° F., the same condition obtains, no color bodies having settled out.

About 400 ml. of n-butanol are added, with heating to maintain the temperature at about 170° F. The system is still homogeneous, and no color bodies settle out. About 50 ml. of water are added, and the water settles to the bottom forming a clear layer; no color bodies settle out.

This example shows that the presence of benzene in too great a proportion to the wax prevents the separation according to the invention from being obtained.

The invention claimed is:

1. Process for decolorizing petroleum wax which consists essentially of (1) admixing petroleum wax containing color bodies with 200–1500 percent of an alkanol solvent having 3 to 6 carbon atoms, (2) subsequently washing the wax-alkanol solution at a temperature above the melting point of the wax with 5 to 250 percent of an aromatic hydrocarbon solvent having 6 to 9 carbon atoms, (3) separating the aromatic-wax alkanol mixture into an upper solvent phase containing liquid decolorized wax and a lower phase containing color bodies, and (4) recovering decolorized wax from the upper phase in a yield of at least 95%.

2. Process according to claim 1 wherein the alkanol is sec.-butyl alcohol.

3. Process according to claim 1 wherein the aromatic hydrocarbon is benzene.

4. Process according to claim 1 wherein additionally the resulting mixture from step (2) is washed with 200 to 1500 percent water.

5. Process for decolorizing petroleum wax which consists essentially of (1) admixing petroleum wax containing color bodies with 300 to 1000 percent of sec.-butyl alcohol, (2) washing the wax-alcohol solution at 160° F. to 200° F. with from 10 to 200 percent benzene, (3) washing the wax-alcohol-benzene mixture with from 300 to 1000 percent water at 160° F. to 200° F., (4) allowing the benzene-wax-alcohol-water mixture to settle whereby liquid decolorized wax is contained in an upper layer and the color bodies are contained in a lower layer, and (5) recovering decolorized wax from the upper layer.

6. Process according to claim 5 wherein the yield of decolorized wax is at least 95 percent.

References Cited by the Examiner

UNITED STATES PATENTS

| | | | |
|---|---|---|---|
| 1,836,020 | 12/31 | Freytag | 208—24 |
| 1,848,636 | 3/32 | Livingstone | 208—24 |
| 2,168,330 | 8/39 | Ferris | 208—24 |
| 2,616,830 | 11/52 | Pratt | 208—27 |

FOREIGN PATENTS 386,632  12/23  Germany.

ALPHONSO D. SULLIVAN, *Primary Examiner.*